(12) United States Patent
Chigira

(10) Patent No.: US 7,639,050 B2
(45) Date of Patent: Dec. 29, 2009

(54) LOAD-DRIVE CONTROLLER

(75) Inventor: Atsushi Chigira, Kyoto (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 12/120,462

(22) Filed: May 14, 2008

(65) Prior Publication Data

US 2008/0284500 A1  Nov. 20, 2008

(30) Foreign Application Priority Data

May 14, 2007  (JP) ............................. 2007-127951

(51) Int. Cl.
  *H03K 3/00*  (2006.01)
(52) U.S. Cl. ........................ 327/108; 327/112; 318/256; 318/434; 361/79
(58) Field of Classification Search ......... 327/108–112; 318/256, 434; 361/79
  See application file for complete search history.

(56) References Cited

U.S. PATENT DOCUMENTS 7,142,050 B2 *  11/2006  Risbo ......................... 330/10

FOREIGN PATENT DOCUMENTS

| JP | 9-219995 | 8/1997 |
| JP | 2005-184897 | 7/2005 |

* cited by examiner

*Primary Examiner*—Lincoln Donovan
*Assistant Examiner*—Daniel Rojas
(74) *Attorney, Agent, or Firm*—RatnerPrestia

(57) ABSTRACT

In a load-drive controller, a first comparing unit compares a load current supplied from an H bridge circuit and a desired setting current; a PWM control unit generates a control signal to control the load current; a gate driver drives and controls output transistors of the H bridge circuit based on the control signal, and a load current monitoring unit determines which is larger a level shift equivalent value of the setting current or a peak hold equivalent value of the load current, and the PWM control unit controls increase or decrease of the load current based on a comparison result of the first comparing unit and on a determination result of the load current monitoring unit, so that the load current quickly reaches the setting current of a micro step drive during decrease of the setting current.

7 Claims, 8 Drawing Sheets

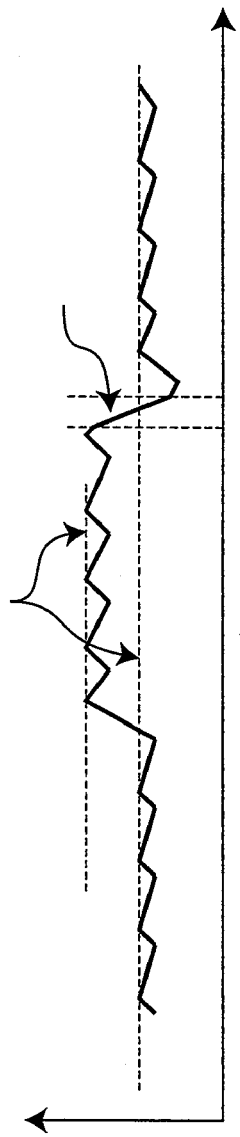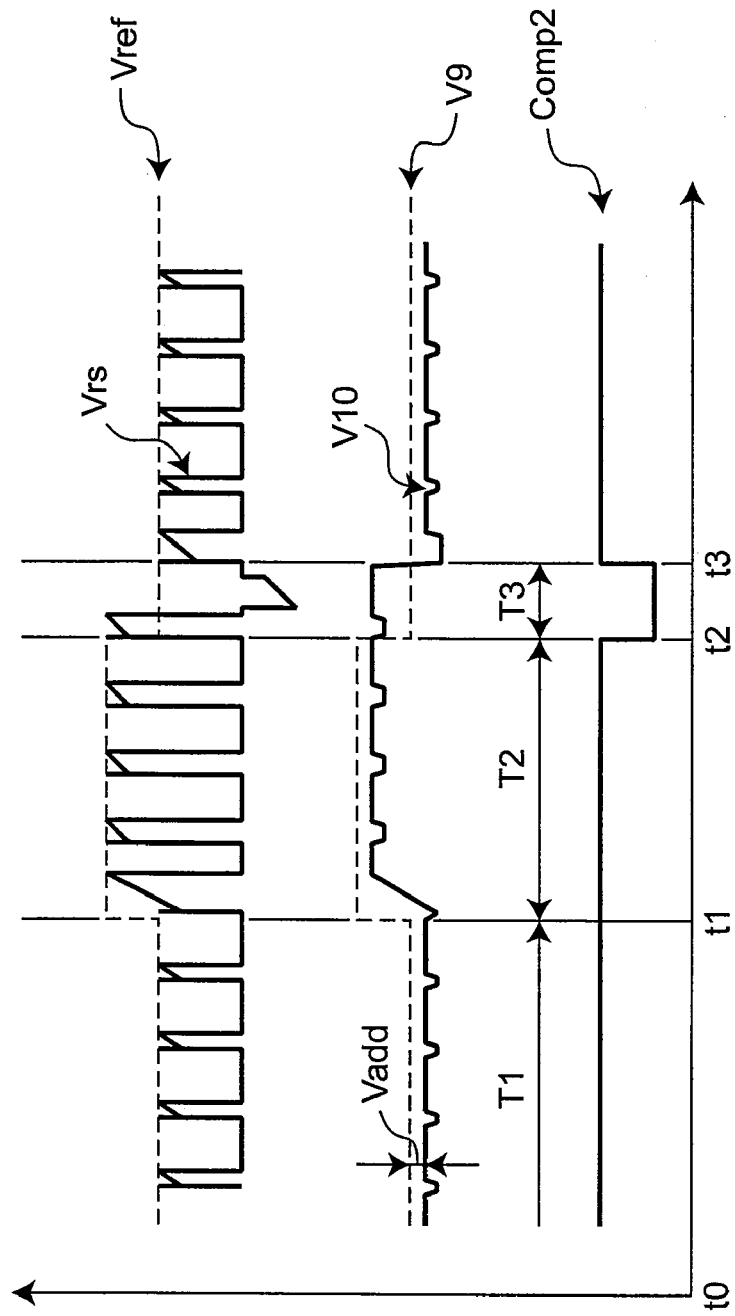
Fig.3A
Fig.3B
Fig.3C
Fig.3D

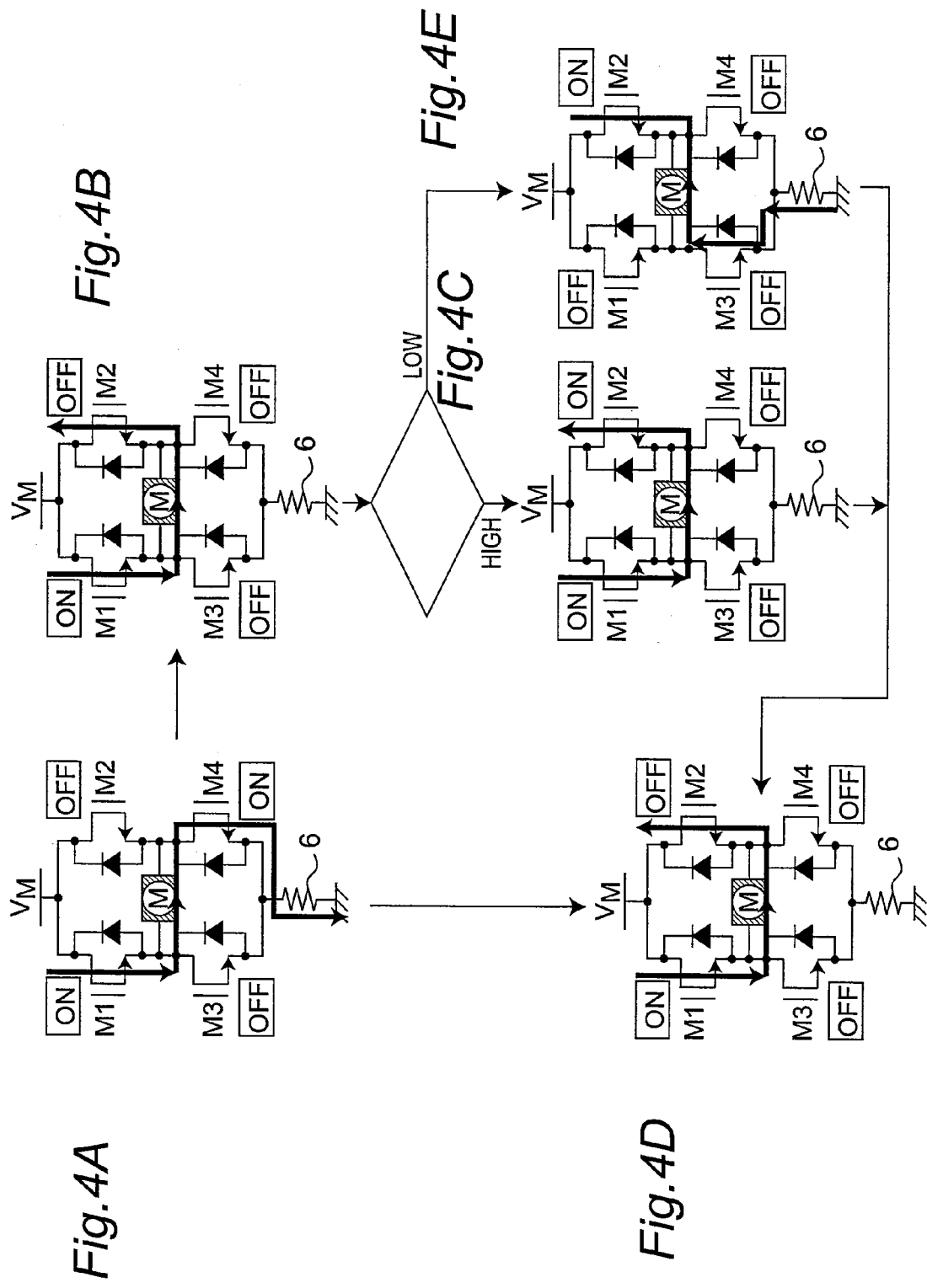

LOAD-DRIVE CONTROLLER

BACKGROUND OF THE INVENTION

1. Field of the Invention

The present invention relates to a load-drive controller, and to a load driving apparatus provided with a control circuit for an H bridge circuit suitable for driving a reactance load.

2. Description of the Related Art

Drive of a stepping motor is controlled by controlling a current (hereinafter referred to as "load current") applied to a load such as a coil. The load is connected to an H bridge type load driving circuit (hereinafter referred to as "H bridge circuit"), and the load current is increased or decreased by turning on or off transistors provided in the H bridge circuit for supplying a load current.

A load-drive controller includes a voltage source for setting a current to have a reference value, a comparator for comparing the current setting voltage generated by the voltage source and a voltage obtained through a current detecting resistor, a PWM control unit, an oscillator for generating a PWM waveform signal, a gate driver for driving output transistors, and the H bridge circuit for driving a load. The load current is converted into a voltage through the current detecting resistor.

For example, in a conventional load-drive controller disclosed in Japanese Patent Laid-Open Publication No. 9-219995, an H bridge circuit includes four transistors (hereinafter referred to as M1, M2, M3, and M4) and repeats ON/OFF operations of the transistors. Specifically, when receiving a command in which an electrically conducting direction becomes M1→load M→M4, M1 is always turned on, M4 is repeatedly turned on and off, M3 is always turned off, and M2 is repeatedly turned on and off. When the electrically conducting direction is inverted, M2 is always turned on, M3 is repeatedly turned on and off, M4 is always turned off, and M1 is repeatedly turned on and off.

In this conventional current control method, a recovery current flows at the moment M4 is turned on in an electrically conducting mode. Therefore, M4 is turned on to increase the load current while the command of the comparator is neglected during an enforcement conducting time, and the comparator compares a voltage detected by a current detecting resistor (hereinafter referred to as "detection voltage") and a current setting voltage (hereinafter referred to as "reference voltage", too), and comparison result is reset at a time the detection voltage is matched with the current setting voltage. Thus, the step of the control process enters a diode regenerative mode in which M4 is turned off, M1 is turned on, and M2 is turned off. After a predetermined time elapsed, M2 is turned on so that the step of the process enters a synchronous rectification mode, and thereafter M2 is turned off again and the step of process enters the diode regenerative mode. After the electrically conducting mode is ended, the load current is decayed, and the step of the process enters the electrically conducting mode at predetermined intervals to increase the load current. By repeating these steps of the process, the peak value of the load current flowing through the load is controlled to be constant.

Next, a conventional method of keeping the peak value of the load current constant is described with reference to FIGS. 7 to 9. FIG. 7 shows a conventional relationship between the setting current and the load current, FIG. 8 shows a changing state of a conventional setting current in a micro step manner; and FIGS. 9A and 9B show a conventional relationship between the setting current and the load current, wherein FIG. 9A shows a state of the load current following the setting current, and FIG. 9B shows a timing chart of the setting voltage. In FIG. 7, an interval (a) corresponds to a period of the electrically conducting mode, intervals (b) and (d) correspond to a period of the diode regenerative mode, and an interval (c) corresponds to a period of the synchronous rectification mode.

In a transition from the diode regenerative mode to the electrically conducting mode, when M4 is turned on in a state in which a forward current flows through a parasitic diode of M2 in the diode regenerative mode, a backward voltage is applied for a moment to the parasitic diode of M2 to flow a backward current (recovery current) through the parasitic diode of M2. If the recovery current flows through the current detecting resistor, there arises a trouble such that the comparator is inverted and the mode transition is made from the electrically conducting mode to the diode regenerative mode although the load current does not reach the setting current. Therefore, in order to prevent such a mistake in detection, a countermeasure called an enforcement electrically conducting mode is taken to disable the result of the comparison between the load current and the setting current for a predetermined time after the transition to the electrically conducting mode. Thus, a reset signal of the comparator is neglected during the electrically enforcement conducting mode.

Meanwhile, for the purpose of silencing a stepping motor, a coil current is finely cut to form a pseudo-sine wave in a micro step drive. As shown in FIG. 8, the setting current is changed in stepwise, and the current flowing through the load is controlled like the pseudo-sine wave. In the case where the load is a stepping motor, a micro step wave is formed to realize low vibration and low noise.

In the micro step wave control shown in FIG. 8 of the conventional load-drive controller, when the setting current is changed in the current increase duration, the load current rapidly reaches the setting current by the process of the electrically conducting mode. However, in the current decrease duration, since the current decay is low-speed decay caused by diode regeneration or synchronous rectification regeneration, the decay time is determined based on a time constant of the inductance load. In addition, as described above, because the electrically enforcement conducting operation is performed at predetermined periods of the PWM control, it takes a longer time to cause the load current to reach the setting current.

In the setting current decrease duration, the current decay of the PWM control is the low-speed decay as shown in FIGS. 9A and 9B when the setting current is decreased, and it takes a long time to reach the setting current because of the existence of the electrically enforcement conducting time. Referring to FIG. 9B, the reference voltage having a certain low level is supplied in a first predetermined duration (T1), a high-level reference voltage is maintained in a second predetermined duration (T2), and the original low-level reference voltage is maintained in a third predetermined duration (T3). Referring to FIG. 9A, the load current is changed by following the reference voltage (corresponding to "setting current"). On the other hand, the detection voltage from the H bridge circuit is decreased by following the reference voltage (setting current), and the detection voltage is gently changed in the stepwise manner in the third duration T3. Therefore, there is a problem that follow-up capability of the load current to the setting current is deteriorated.

SUMMARY OF THE INVENTION

In view of the foregoing, it is a main object of the present invention is to provide a load-drive controller which can control a load current to rapidly reach a setting current even in a current decrease duration in a micro step wave control.

In order to accomplish the above object, a load-drive controller according to the present invention controls a drive of a load by setting a load current to be a desired current to be applied to the load. The load-drive controller comprises: a voltage source for obtaining a reference voltage which is equivalent to a setting current of the desired current; an H bridge circuit comprised of output transistors for controlling the drive of the load; a first comparing unit for comparing a value of a load current supplied from the H bridge circuit and the desired set current value of the setting current; a PWM control unit for generating a control signal to control the load current; and an output drive unit for driving and controlling the output transistors of the H bridge circuit based on the control signal. The load-drive controller further comprises a load current monitoring unit for determining which is larger a level shift value of the setting current or a peak hold value of the load current. In this arrangement, the PWM control unit controls increase or decrease of the load current based on a comparison result of the first comparing unit and a determination result of the load current monitoring unit.

In the load-drive controller according to the aspect of the present invention, the load current can be controlled to rapidly reach the setting current even in the current decrease duration in the micro step wave control.

BRIEF DESCRIPTION OF THE DRAWINGS

FIGS. 3A, 3B, 3C and 3D are waveform charts for operating the load-drive controller according to the present invention;

FIGS. 4A, 4B, 4C, 4D and 4E are charts showing a sequence of operating the load-drive controller according to the present invention;

DETAILED DESCRIPTION OF THE PREFERRED EMBODIMENTS

Figure 1:
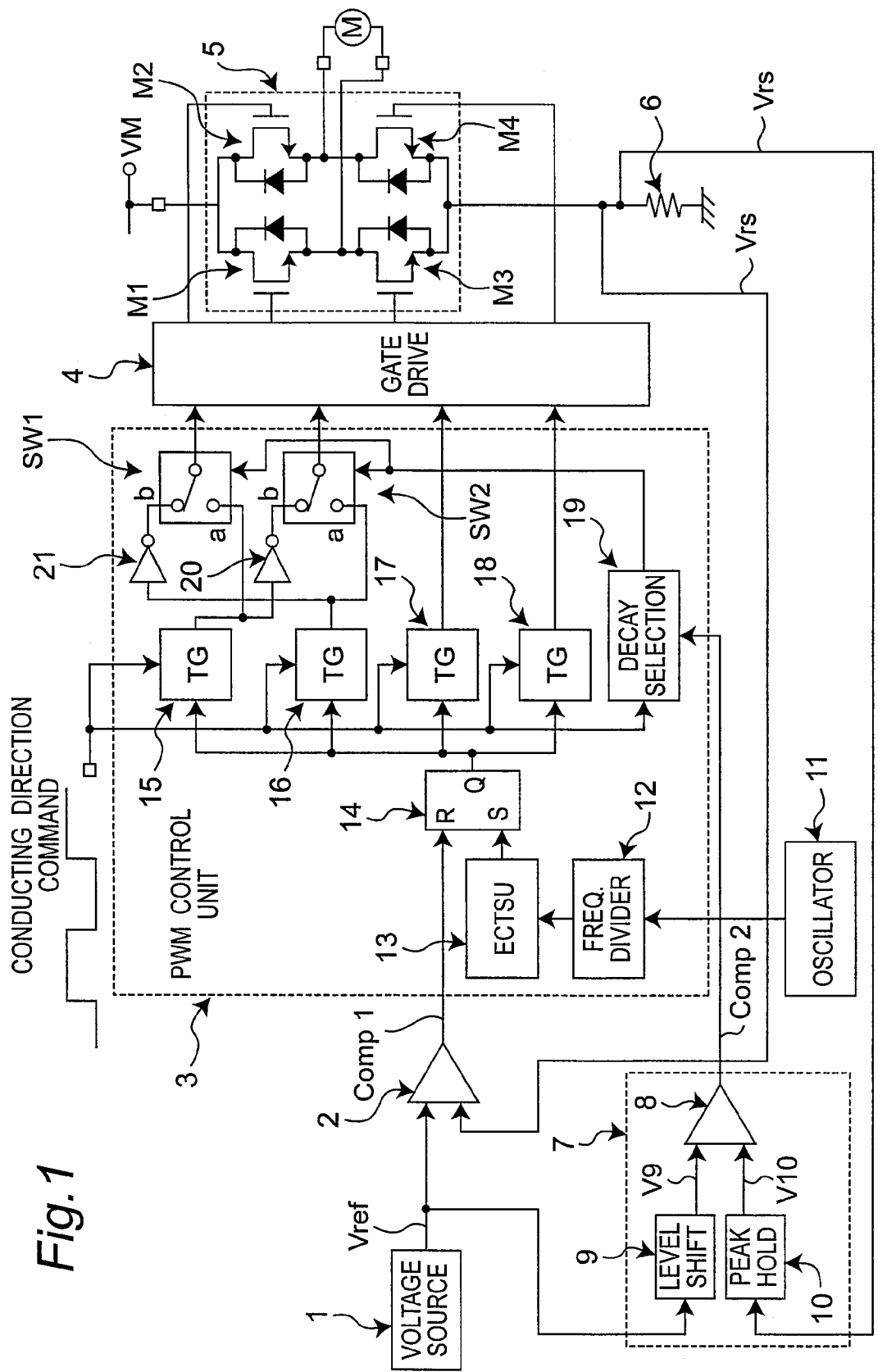
FIG. 1 is a block diagram showing a configuration of a load-drive controller according to an embodiment of the invention.

An exemplary embodiment of the present invention will be described below with reference to the accompanying drawings. In the drawings, the same component is designated by the same numeral.

FIG. 1 is a block diagram showing a configuration of a load-drive controller according to an embodiment of the present invention. The load-drive controller includes a voltage source 1 for obtaining a setting current, a first comparator 2, a PWM control unit 3, a gate drive 4, an H bridge circuit 5, a current detecting resistor 6, an oscillator 11, and a load current monitoring unit 7. The load current monitoring unit 7 includes a second comparator 8, a level shift circuit 9, and a peak hold circuit 10. The oscillator 11 generates a reference clock which is used for reference timing of controlling the load current to be increased or decreased.

The voltage source 1 supplies a reference voltage Vref corresponding to the setting current which is used as a reference current in controlling the load current to be increased or decreased. An output end of the voltage source 1 is connected to one of input terminals of the first comparator 2, and the reference voltage Vref corresponding to the setting current is supplied to the first comparator 2. A connection point between the current detecting resistor 6 and the H bridge circuit 5 is connected to the other input terminal of the first comparator 2 so that a detection voltage Vrs corresponding to the load current is supplied to the other input terminal of the first comparator 2. The comparison result of both of the inputted voltages is outputted as a signal Comp 1 from the first comparator 2 and supplied to the PWM control unit 3. An output of the PWM control unit 3 is supplied to the gate drive 4, and an output of the gate drive 4 is supplied to gates of four NMOS transistors M1, M2, M3, and M4 constituting the H bridge circuit 5.

Meanwhile, the output end of the voltage source 1 is also connected to an input terminal of the level shift circuit 9, and the reference voltage Vref corresponding to the setting current is supplied to the level shift circuit 9. The connection point between the current detecting resistor 6 and the H bridge circuit 5 is connected to an input terminal of the peak hold circuit 10, and the detection voltage Vrs corresponding to the load current is supplied to the peak hold circuit 10. The second comparator 8 compares an output voltage V9 of the level shift circuit 9 and an output voltage V10 of the peak hold circuit 10, and a comparison result, i.e., an output signal Comp2 of the second comparator 8 is supplied to the PWM control unit 3.

The PWM control unit 3 generates a PWM control signal for controlling an ON/OFF operation of the NMOS transistors M1 to M4 in the H bridge circuit 5 based on the output comparison results Comp1 and Comp2. The PWM control unit 3 controls the current to be supplied to the load by way of the gate drive 4 such that the setting current has a pseudo sine waveform of a micro step drive. Thus, the gate drive 4 controls the ON/OFF operation of the NMOS transistors M1 to M4 by applying predetermined voltages to the gates of the NMOS transistors according to the control signal supplied from the PWM control unit 3.

In the configuration of FIG. 1, the detection voltage Vrs corresponding to the load current is supplied from the H bridge circuit 5 to one of the input terminals, e.g., an inverting input terminal of the first comparator 2, and the reference voltage Vref corresponding to the setting current in a pseudo sine waveform of a micro step drive is supplied to the other input terminal, e.g., a non-inverting input terminal of the first comparator 2. The first comparator 2 compares the detection voltage Vrs and the reference voltage Vref to determine which is larger the load current or the setting current, and the first comparator 2 supplies the resultant signal Comp 1 to the PWM control unit 3.

In this arrangement of the NMOS transistors M1, M2, M3, and M4 constituting the H bridge circuit 5, drains of the upper side transistors M1 and M2 are connected to a power supply $V_M$, and the transistors M1 and M3 are connected in series, and the transistors M2 and M4 are connected in series. An intersecting point connected to sources of the lower side transistors M3 and M4 are grounded through the current detecting resistor 6. One end of a load M is connected to a connection point between the source of the transistor M1 and the drain of the transistor M3, and the other end of the load M is connected to a connection point between the source of the transistor M2 and the drain of the transistor M4. Therefore, the PWM control unit 3 controls the ON/OFF operation of the NMOS transistors M1 to M4.

A configuration of the PWM control unit 3 shown in FIG. 1 will be described below. The PWM control unit 3 includes a frequency divider 12, an enforcement conducting time setting unit (ECTSU) 13, an R-S flip-flop 14, timing generators 15 to 18, inverters 20 and 21, a decay selection command unit 19, and first and second switching elements SW1 and SW2. The frequency divider 12 divides a frequency of a reference clock signal generated by the oscillator 11. The enforcement conducting time setting unit (ECTSU) 13 receives the divided frequency outputted of the frequency divider 12 to set the enforcement conducting time. The R-S flip-flop 14 resets the comparison result Comp1 of the first comparator 2 based on the enforcement conducting time. The timing generators 15 to 18 generate timing signals to control the gates of the transistors M1 to M4. The inverters 20 and 21 supply the control signals to the upper side transistors M1 and M2 during high-speed decay. The decay selection command unit 19 selects a high-speed decay mode or a low-speed decay mode. The first and second switching elements SW1 and SW2 switch the control signals of the upper side transistors in response to a selection command supplied from the decay selection command unit 19.

The comparison result Comp1 of the first comparator 2 and the enforcement conducting time set by the enforcement conducting time setting unit 13 are fed to a reset (R) terminal and a setting (S) terminal of the R-S flip-flop 14, respectively. The timing generators 15 to 18 generate timing signals to control the gates of the transistors M1 to M4 in the H bridge circuit 5 based on a PWM waveform obtained by receiving a conducting direction command fed from the oscillator and the output of the R-S flip-flop 14. The timing signal obtained from the timing generators 15 and 16 for the upper side transistors M1 and M2 are fed to the inverters 20 and 21, and the inverters 20 and 21 supply the control signal to the upper transistors M1 and M2 during the high-speed decay. The decay selection command unit 19 selects the high-speed decay mode or the low-speed decay mode based on the conducting direction command and the comparison result Comp2 of the second comparator 8.

Figure 5:
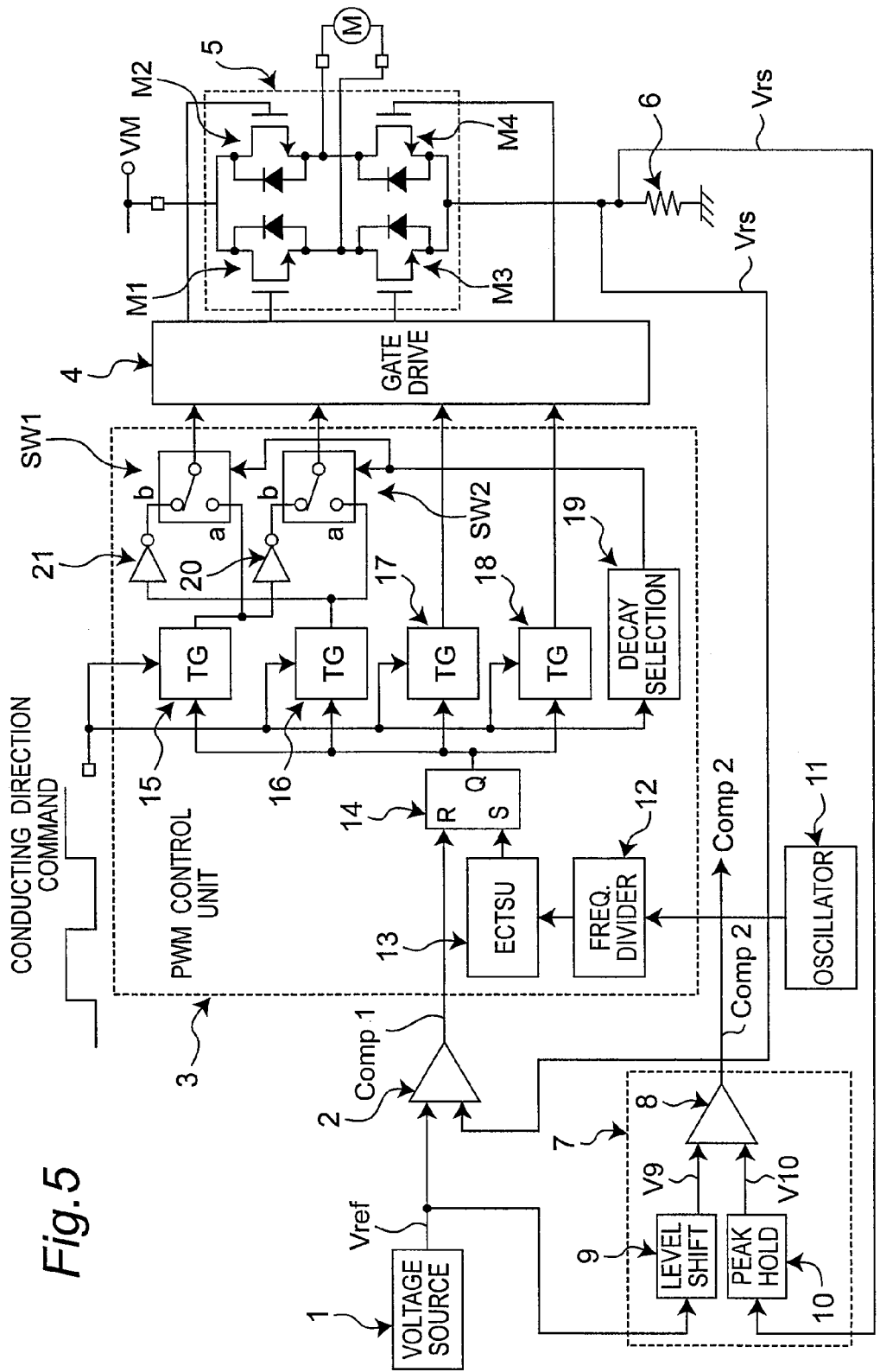
FIG. 5 is a block diagram showing a comparative configuration for explaining an operation of a load current monitoring unit of the present embodiment.

In this configuration, for the purpose of explanation of an operation of the load current monitoring unit 7 in the load-drive controller, an operation in which the comparison result Comp2 of the load current monitoring unit 7 is not fed back to the PWM control unit 3 as shown in FIG. 5 will be described as an comparative example with reference to FIGS. 6A, 6B and 6C. FIGS. 6A, 6B and 6C are waveform charts for explaining the operation of the load current monitoring unit 7 of the embodiment, showing timing charts of input and output voltages of the load current monitoring unit 7. FIG. 6A shows the reference voltage Vref fed by the voltage source 1 to the level shift circuit 9 with a broken line and also shows the detection voltage Vrs with a solid line which is obtained by converting the load current across the current detecting resistor 6. The detection voltage Vrs is fed in common to the peak hold circuit 10 and the first comparator 2. FIG. 6B shows the output signal $V_9$ of the level shift circuit 9 with a broken line, and also shows the output signal $V_{10}$ of the peak hold circuit 10 with a solid line. FIG. 6C shows a waveform of the signal Comp2 indicating the comparison result of the second comparator 8.

Referring to FIGS. 6A, 6B and 6C, in a first interval T1 between an operation start time t0 and a time t1, the reference voltage Vref having a certain low level is supplied as shown in FIG. 6A. Then, the reference voltage Vref rises at a time t1, the high-level reference voltage Vref is maintained in a second interval T2 between the time t1 and a time t2, and the reference voltage Vref falls to the low level at the time t2. Therefore, the detection voltage Vrs obtained from the H bridge circuit 5 is varied by following the reference voltage (setting voltage) Vref, and the detection voltage Vrs is gently decreased in a stepwise manner in a third interval T3 between the time t2 and a time t3.

As shown in FIG. 6B, the level shift circuit 9 level-shift the reference voltage Vref fed from the voltage source 1, thereby obtaining the level shift output signal V9 shown by a broken line. The peak hold output signal V10 shown by a solid line in FIG. 6B is generated by the peak hold circuit 10, and the peak hold output signal V10 is gently decreased in a stepwise manner in the third interval T3. V9>V10 in the first interval T1 and the second interval T2, V9<V10 in the third interval T3, and V9>V10 after the time t3. Accordingly, as shown in FIG. 6C, the output signal Comp2 of the second comparator 8 becomes a low state in the third interval T3 according to the comparison result of the second comparator 8, and the output Comp2 of the second comparator 8 becomes a high state in the intervals except for the third interval T3.

A peak point of the detection voltage Vrs is equivalent to a peak of the load current. Therefore, the peak point of the detection voltage Vrs is maintained to allow the load current to be monitored. In the embodiment, as shown in FIG. 6B, preferably the level shift circuit 9 adds a predetermined voltage Vadd to the reference voltage Vref. The added voltage is set to a value necessary to cause the output Comp2 of the second comparator 8 to be the high state (i.e., Vref+Vadd=V9>V10) in the first interval T1 and the second interval T2 shown in FIG. 6B, preferably a value ranging from 100 mV to several hundreds millivolts.

In FIG. 6B, the output signal Comp2 of the second comparator 8 becomes the high state because the level shift voltage V9 is larger than the peak hold voltage V10 in the second interval T2 in which the setting current is increased. On the other hand, since the follow-up capability of the load current to the setting current is reduced (gentle) in the third interval T3 in which the setting current is decreased, the peak hold voltage V10 becomes larger than the level shift voltage V9, the output Comp2 of the second comparator 8 is inverted in level to be the low state. Thus, at the time t2 when the output of the second comparator 8 becomes the low state, it is determined that the load current is larger than the setting current.

The following describes an operation of the load-drive controller according to the present embodiment shown in FIG. 1 with reference to FIGS. 2 to 4 in the case where the follow-up capability of the load current is improved by feeding back the output of the load current monitoring unit 7, i.e., output signal Comp2 of the second comparator 8 to the PWM control unit 3.

Figure 2A:
FIGS. 2A, 2B, 2C, 2D, 2E and 2F are waveform charts for operating a PWM control unit of the load-drive controller according to the present invention.
Figure 2B:
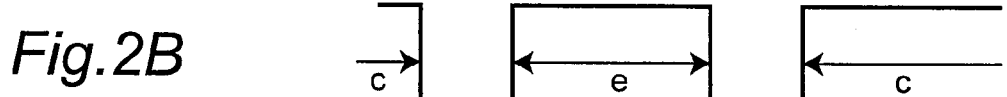
Figure 2C:
Figure 2D:
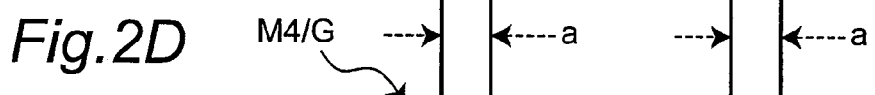
Figure 2E:
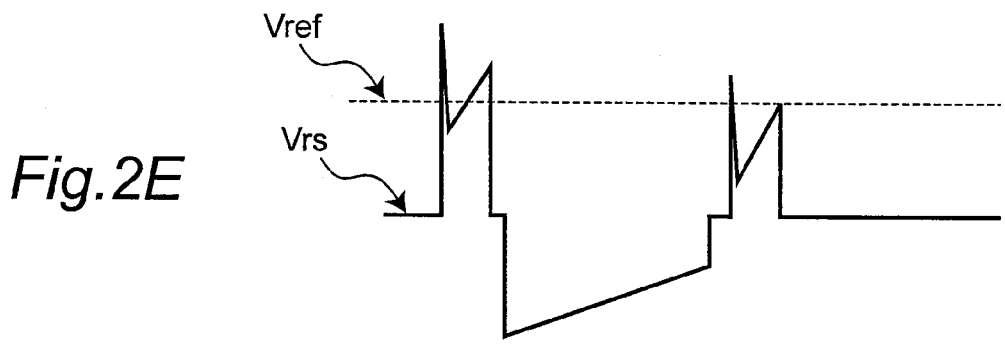
Figure 2F:
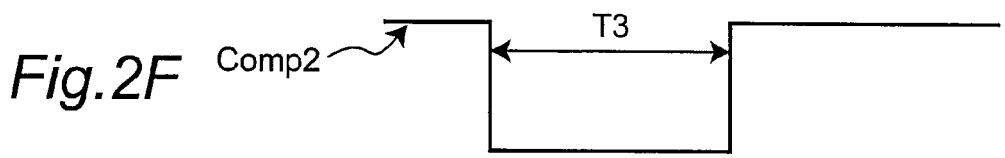

FIGS. 2A-2F are timing charts in the vicinity of the high-speed decay mode of the PWM control unit in the load-drive controller of the present embodiment, FIGS. 3A-3D are waveform charts of operating the load-drive controller of the present embodiment, and FIGS. 4A-4E show a sequence of operating the load-drive controller of the present embodiment. FIGS. 2A to 2D show timing signal waveforms generated by TG 15 to TG 18 respectively. FIG. 2E is a waveform chart showing the state in which the detection voltage Vrs is varied by following the reference voltage Vref (corresponding to the setting current) in the vicinity of the high-speed decay mode. In FIG. 2E, the reference voltage is shown by the broken line, and the detection voltage is shown by the solid line. In the duration of the high-speed decay mode shown in FIG. 2E, the reason why the load current is decreased while the detection voltage Vrs is increased is that the load current is reversely passed. FIG. 2F shows a waveform of the output signal Comp2 of the second comparator 8 in the vicinity of the high-speed decay mode. In FIGS. 2A-2F, a timing duration "a" corresponds to the electrically conducting mode, timing durations "b" and "d" correspond to the diode regenerative mode, a timing duration "c" corresponds to the synchronous rectification mode, and a timing duration "e" corresponds to the high-speed decay mode.

FIGS. 3A-3D show timing charts of input and output voltages of the load current monitoring unit 7, wherein FIG. 3A is a waveform chart showing the state in which the load current is varied according to the change of the setting current (corresponding to the reference voltage). FIG. 3B is a waveform chart showing the state in which the detection voltage Vrs from the H bridge circuit 5 is varied by following the reference voltage Vref (corresponding to the setting current). In FIG. 3B, the reference voltage is shown by the broken line, and the detection voltage is shown by the solid line. FIG. 3C shows a relationship in magnitude between the output signal V9 of the level shift circuit 9 and the output signal V10 of the peak hold circuit 10. In FIG. 3C, the output signal V9 of the level shift circuit 9 is shown by the broken line, and the output signal V10 of the peak hold circuit 10 is shown by the solid line. FIG. 3D is a waveform chart showing the comparison result signal Comp2 which is outputted of the second comparator 8 and fed back to the PWM control unit 3. In the present embodiment, when the output signal Comp2 of the load current monitoring unit 7 becomes the low state, the decay selection command unit 19 generates a decay selection command to switch the first switching element SW1 from a continuous ON state (side "a" of SW1) to an inverting signal (side "b" of SW1) of the synchronous rectification command of M2, and the transistor M1 is turned off to select the high-speed decay mode (e).

FIGS. 4A-4E show a sequence of operating the load-drive controller of the present embodiment. In the electrically conducting mode shown in FIG. 4A, the transistors M1 and M4 are turned on, and the transistors M2 and M3 are turned off, thereby increasing the current flowing through the load. When the voltage generated across the current detecting resistor 6 reaches the reference voltage, the transistor M4 is turned off and the control process of the load-drive controller enters the diode regenerative mode as shown in FIG. 4B. Then, the second comparator 8 compares the output V10 of the peak hold circuit 10 and the output V9 of the level shift circuit 9, and the second comparator 8 generates the signal Comp2 of the comparison result which is fed back to the PWM control unit 3.

When the signal Comp2 of the comparison result is in the high state (i.e., V9>V10), the transistor M2 is turned on after a predetermined time elapsed, and the control process of the load-drive controller enters the synchronous rectification mode as shown in FIG. 4C. The reason why the synchronous rectification mode is used is that a power consumption loss can be lessened by turning on the transistor to pass the current rather than the current passed through the diode due to the relationship between the on-resistance and regenerative current of the transistors M1, M2, M3, and M4. For example, assuming that the regenerative current is set to 1.5 A, the on-resistance of the transistor is set to 0.5 ohm, and the voltage generated in passing the current of 1.5 A through the diode is set to 1 V:

diode regeneration: P=1.5 A×1 V=1.5 W, and
synchronous rectification mode: P=1.5 A×0.5 ohm×1.5 A=1.125 W.

Thus, the low power consumption can be achieved in the synchronous rectification mode.

On the other hand, when the signal Comp2 of the comparison result is in the low state, the control process of the load-drive controller enters the diode regenerative mode shown in FIG. 4D through the high-speed decay mode of FIG. 4E. In this case, the control process of the load-drive controller does not pass through the synchronous rectification mode shown in FIG. 4C. In the high-speed decay mode of FIG. 4E, as described above, the decay selection command unit 19 controls the first switching element SW1 to turn off the transistor M1. Therefore, energy accumulated in the load M is consumed by the current passed through the current path shown in FIG. 4E, i.e., the current passed from a ground-side end portion GND to detection resistor 6→parasitic diode of transistor M3→load M→parasitic diode of transistor M2→power supply VM. Since the load-drive controller enters the next electrically conducting mode operation after the energy accumulated in the load is consumed by the high-speed decay mode, the load current can quickly reach the setting current.

Then, as shown in FIG. 4D, the transistor M2 is turned off and the control process of the load-drive controller enters the diode regenerative mode. Thus, in the case where the signal Comp2 indicating the comparison result of the second comparator 8 becomes the high state, the current passed through the load is decayed shown in FIGS. 4B to 4D after the electrically conducting mode, and the control process enters the electrically conducting mode at predetermined periods, and the load current is increased. The peak current passed through the load is controlled to be a constant value by the repetition of the above processes.

The relationship of the input and output signals of the load current monitoring unit 7 in the high-speed decay mode of FIG. 4E is shown by the waveform charts in the interval T3 (duration t2 and t3) in FIGS. 3A-3D. That is, in the interval T3, because the level shift output is smaller than the peak hold output (V9<V10) as shown in FIG. 3C, the comparison result signal Comp2 of the second comparator 8 becomes the low state as shown in FIG. 3D. When the transistor M1 is turned off, the energy accumulated in the load M is rapidly consumed by the current passed through the current path shown in FIG. 4E, and the detection voltage reaches the reference voltage at the time t3 as shown in FIG. 3B, and the load current is rapidly decayed in the corresponding duration shown in FIG. 3A in the interval T3.

Figure 6:
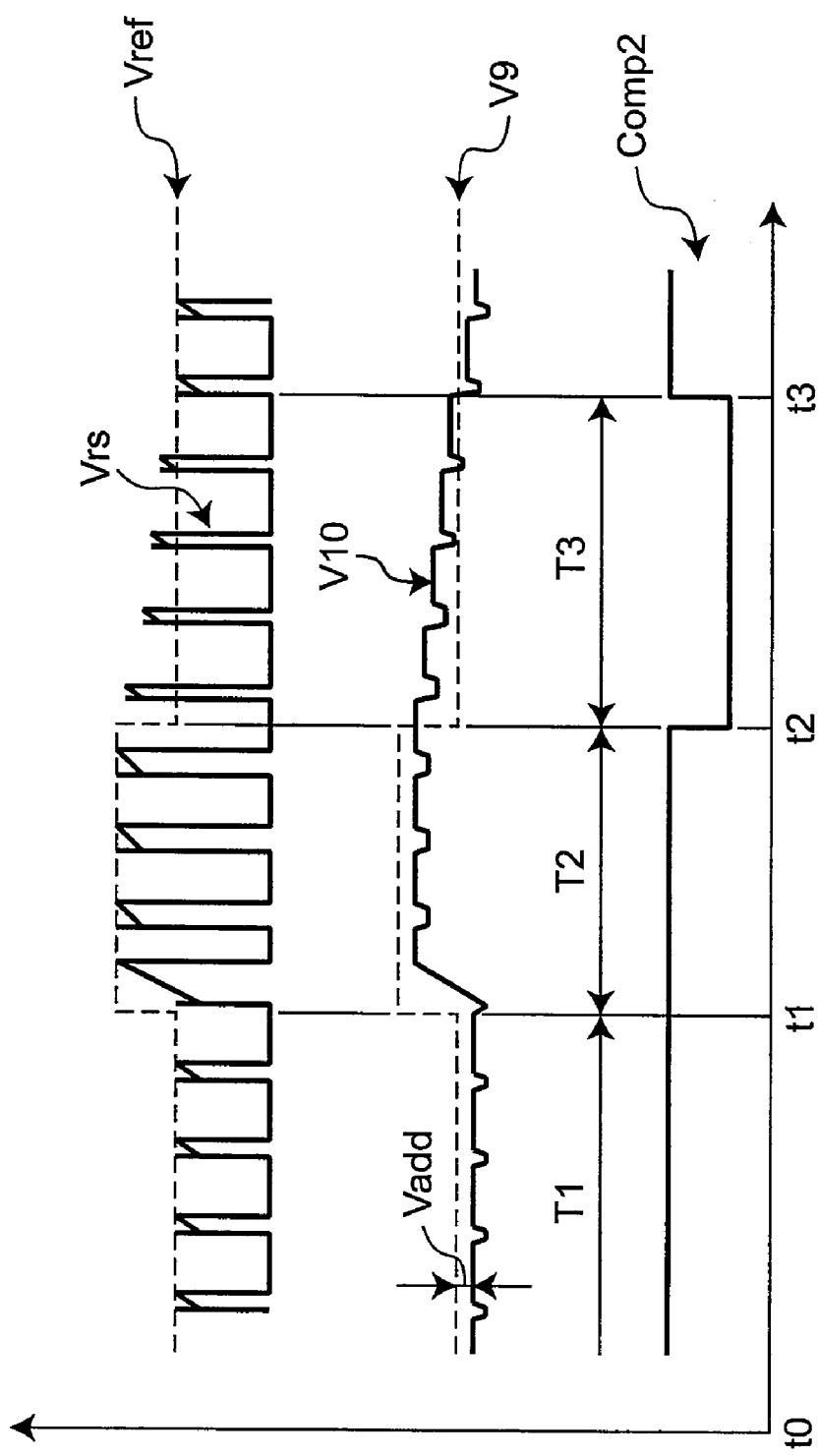
FIGS. 6A, 6B and 6C are waveform charts for explaining the operation of a load current monitoring unit of the present embodiment.
Figure 7:
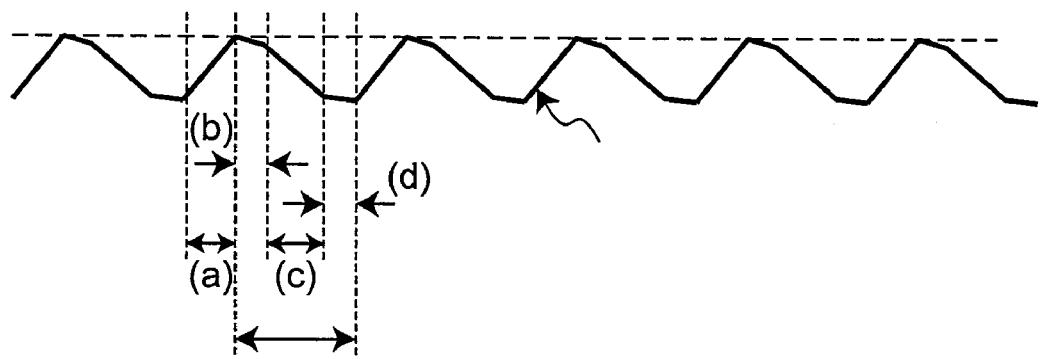
FIG. 7 is a waveform chart showing a conventional relationship between a setting current and a load current.
Figure 8:
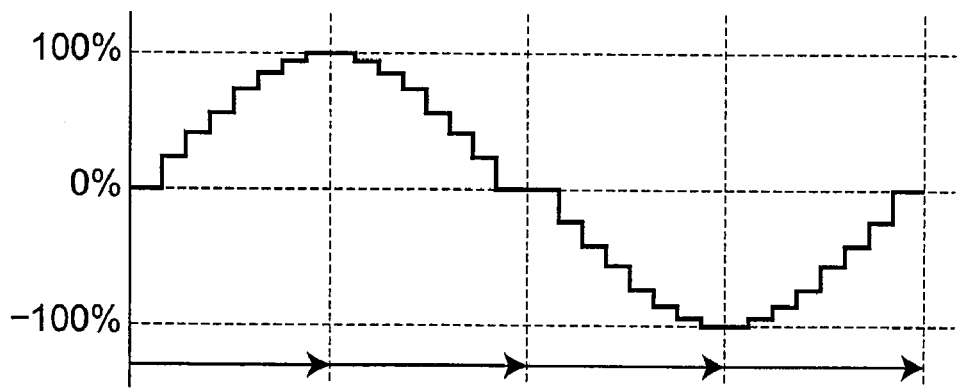
FIG. 8 is a micro step waveform chart showing a conventional change in setting current.
Figure 9A:
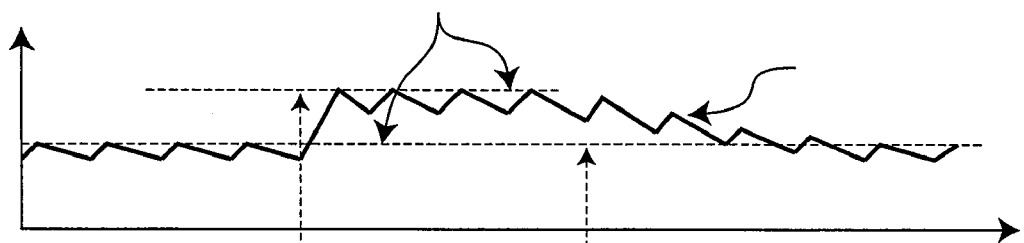
FIGS. 9A and 9B are waveform charts for showing a conventional relationship between a setting current and a load current.
Figure 9B:
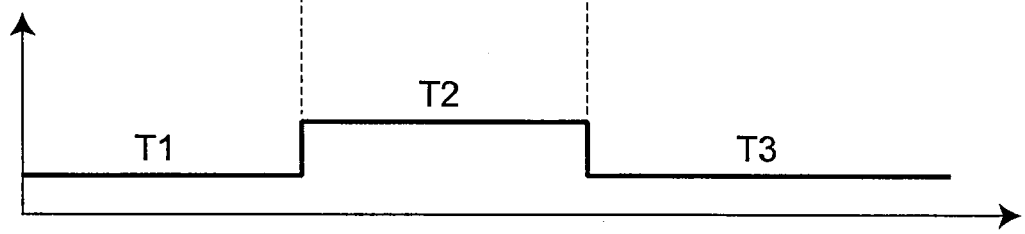

The high-speed decay interval T3 in the high-speed decay mode of FIG. 3 becomes much shorter than the low-speed decay interval T3 of FIG. 6, and the follow-up capability of the load current can be improved by employing the high-speed decay mode.

In the embodiment, the H bridge circuit is formed by only the N-ch type MOS transistors. Alternatively, it is noted that the upper transistors may be formed by PMOS transistors. The transistor may be formed of other types than the MOS type transistor, for example may be formed of a bipolar transistor.

In addition, it is noted that the load-drive controller shown in FIG. 1 may be constructed as an integrated circuit formed on a chip. In this case, the load is located outside the integrated circuit and is connected to the H bridge circuit 5 via a connection terminal (not shown).

As described above, in the load-drive controller according to the aspect of the present invention, since the load current can rapidly reach the setting current in the interval during which the setting current is decreased in the micro step wave, the present invention is useful for a micro step drive with low vibration and low noise in the case where the load is a stepping motor and the like.

What is claimed is:

1. A load-drive controller for controlling a drive of a load by setting a load current to be a desired current to be applied to the load, said load-drive controller comprising:
   a voltage source for obtaining a reference voltage which is equivalent to a setting current of the desired current;
   an H bridge circuit comprised of output transistors for controlling the drive of the load;
   a first comparing unit for comparing a value of a load current supplied from the H bridge circuit and the desired current value of the setting current;
   a PWM control unit for generating a control signal to control the load current;
   an output drive unit for driving and controlling the output transistors of said H bridge circuit based on the control signal; and
   a load current monitoring unit for determining which is larger: a level shifted value of the setting current or a peak hold value of the load current,
   wherein said PWM control unit controls increase or decrease of the load current based on a comparison result of the first comparing unit and a determination result of the load current monitoring unit.

2. The load-drive controller according to claim 1, wherein said PWM control unit includes control mode selection means for selecting at constant intervals a first mode in which the load current is increased or a second mode in which the load current is decayed based on the comparison result of the first comparing unit, and for selectively performing the second mode or a third mode in which the load current is decayed faster than in the second mode, wherein, in a predetermined duration of a predetermined period, in the case where the load current monitoring unit determines that the level shift equivalent value of the setting current is smaller than the peak hold equivalent value of the load current, the control mode selection means performs the third mode in the predetermined duration according to the determination result.

3. The load-drive controller according to claim 1, further comprising a current detecting resistor which is connected to a load current output terminal of the H bridge circuit to convert the load current into a voltage equivalent to the load current value,
   wherein said load current monitoring unit includes:
   a peak hold circuit for holding a peak value of a detection voltage equivalent to the value of the load current generated in the current detecting resistance;
   a level shift circuit for level-shifting the reference voltage by a predetermined value, the reference voltage being equivalent to the desired setting current obtained from the current setting voltage source; and
   a second comparing unit for comparing an output value of the peak hold circuit and an output value of the level shift circuit.

4. The load-drive controller according to claim 3, wherein said control mode selection means includes a decay selection command unit for selecting the second mode or the third mode based on a comparison result of the second comparing unit.

5. The load-drive controller according to claim 4, wherein said PWM control unit includes first and second switching elements for switching a control signal of upper side transistors of the H bridge circuit in accordance with a selection command outputted of said decay selection command unit.

6. The load-drive controller according to claim 1, having an integrated circuit formed on a semiconductor chip construction.

7. A load driving apparatus having a load-drive controller as defined in claim 1.

* * * * *